Sept. 6, 1960  J. L. MELCHOR ET AL  2,951,963

TRAVELING WAVE TUBE

Filed Jan. 26, 1959

INVENTORS
PERRY H. VARTANIAN JR.
JACK L. MELCHOR
BY
ATTORNEY

United States Patent Office 2,951,963
Patented Sept. 6, 1960

2,951,963
TRAVELING WAVE TUBE

Jack L. Melchor, Mountain View, and Perry H. Vartanian, Jr., Menlo Park, Calif., assignors to Sylvania Electric Products Inc., a corporation of Massachusetts Filed Jan. 26, 1959, Ser. No. 788,845

4 Claims. (Cl. 315—3.5)

This invention relates to traveling wave tubes, and in particular a tube of this type having improved beam coupling characteristics.

Traveling wave amplifiers and backward wave oscillators are characterized by electromagnetic waves propagating along a slow wave structure, such as a helix, and an electron beam directed along the axis of this helix. Interactions take place between the electric field of the wave on the helix and the electrons in the beam so that the latter are velocity-modulated while the wave is amplified. In short, energy is transferred from the electron beam to the wave on the helix. The efficiency of this energy transfer, known as beam-coupling coefficient, desirably should be as large as possible for maximum operating efficiency.

A general object of this invention is the provision of a traveling wave tube with means for increasing the beam-coupling coefficient.

A well-known characteristic of traveling wave amplifiers is their tendency to break into oscillations. Waves reflected from the output terminal travel toward the gun end of the tube where they are reflected and travel in the forward direction so as to appear as spurious signals along with desired signals. One way of eliminating these spurious signals is to attenuate the wave near the input end of the tube so that waves propagating in either direction along the helix are absorbed. The disadvantage is, however, that desired signals are attenuated along with the spurious ones with a resultant reduction in gain of the tube. According to our invention, means are provided for increasing the beam-coupling coefficient of the tube for waves propagating in the forward direction along the helix and for decreasing the coupling coefficient for waves traveling in the opposite direction.

It is therefore another object of our invention to provide means for effectively suppressing backward waves in a traveling wave amplifier without attenuating forwardly traveling waves. A further object is the provision of means in a traveling wave amplifier or in a backward wave oscillator for non-reciprocably increasing the interaction between the electromagnetic waves and the electron beam over a broad band of frequencies.

According to our invention, a ferrite element preferably in the form of a sleeve, is placed radially adjacent to the exterior of the helix of the traveling wave amplifier or backward wave oscillator, preferably outside the glass envelope, and is magnetized in such a manner as to have low loss properties for microwave energy and to exhibit a characteristic permeability of approximately zero to a wave traveling in one direction on the helix and to present a relatively high effective permeability to waves propagating in the opposite direction on the helix. As a result of zero permeability in the ferrite, waves on the helix by-pass the ferrite and the electric field of the waves is concentrated to a greater extent inside the helix in the vicinity of the electron beam. This increases interaction between the electron beam and the electric field so as to enhance the amplification of the signal, and so improves the gain of a traveling wave amplifier and the power output of a backward wave oscillator. Reflected waves, traveling in the opposite direction, that is, from the output end toward the gun end of the traveling wave amplifier see the high permeability side of the ferrite and tend to be concentrated within the ferrite so that the electric field of the waves is reduced in the vicinity of the electric beam. This reduces interaction between the beam and reflected wave and also produces some attenuation of this wave as it passes through the ferrite. This all leads to effective suppression of spurious oscillations resulting from such waves. Since in a backward wave oscillator it is desired to increase the energy delivered from the beam to a backward traveling wave, the ferrite sleeve is biased magnetically so that its effective permeability to the backward wave is approximately zero.

The above-mentioned and other features and objects of this invention will be more apparent and better understood from the following description of a preferred embodiment of the invention, reference being had to the accompanying drawings in which.

Figure 1:
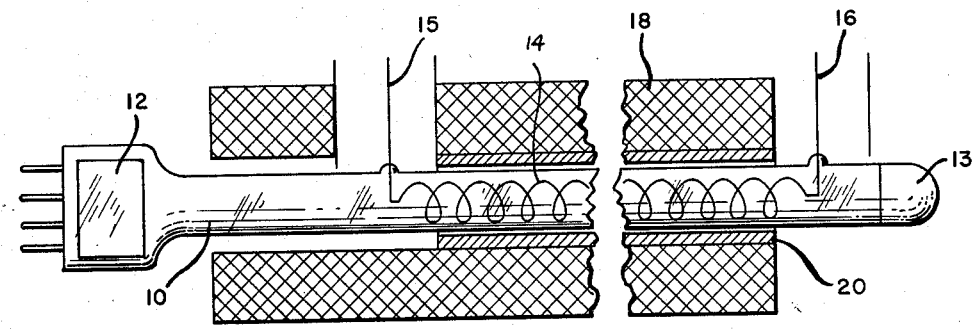
Figure 1 is a longitudinal sectional schematic view of a traveling wave tube embodying this invention.

Referring now to Figure 1 of the drawings, there is shown a traveling wave tube having an elongated envelope 10, one end of which contains an electron gun 12 for emitting an axial stream of electrons which traverse the length of the tube and collect on collector 13 at the opposite end. A slow wave structure in the form of a helix 14 is mounted within the envelope concentrically of the axis and extends for a major part of the tube length for connection to the radio frequency signal input and output terminals 15 and 16, respectively. Electrons in the beam are guided along the tube axis and are prevented from spreading by a unidirectional axial magnetic-focusing field produced by an electro-magnet 18 mounted externally of the tube.

According to this invention, a ferrite element 20, preferably in the form of a sleeve, is mounted exteriorly of, but closely spaced to, envelope 10 and is substantially coextensive with helix 14. In the embodiment shown in the drawing, the ferrite element 20, preferably made of magnesium manganese, is located within the magnet 18 and is magnetized by it to such a degree that the ferrite exhibits low loss and differential permeability characteristics to the waves on the helix as explained below.

The required strength of the unidirectional biasing field for ferrite element 20 is relatively small, in the order of a few hundred oersteds, and therefore the ferrite exhibits a high permeability to electromagnetic waves traveling along helix 14 in one direction, and a relatively low permeability to such waves traveling in the opposite direction. For example, a radio frequency signal entering input terminal 15 travels from left to right as viewed in Figure 1 and sees a ferrite element 20 with an effective permeability of approximately zero. The magnetic field of this wave is therefore excluded from the region of the ferrite, and since the helix is inside the ferrite, there is a concentration of this magnetic field inwardly of the helix and in the vicinity of the electron beam. Conversely, waves traveling from right to left, as viewed, such as waves reflected from output terminal 16, see the high permeability side of the ferrite element. The magnetic field of these waves is effectively concentrated in the ferrite and tends to be withdrawn from the region of the electron beam. The effect of increasing or decreasing the strength of the magnetic component of the electromagnetic wave in the vicinity of the electron beam is to correspondingly increase and decrease, respectively, the strength of the electric field component at the beam. Since the electric field strength in the beam zone is a measure of the wave interaction with the electrons, the coupling is increased for one direction of wave transmission and is decreased for the other. In other wards, the ferrite element when properly magnetized, increases the beam-coupling coefficient for electromagnetic waves traveling in the forward directoin in a traveling wave tube and decreases the beam-coupling coefficient for waves traveling in the opposite direction.

Figure 2:
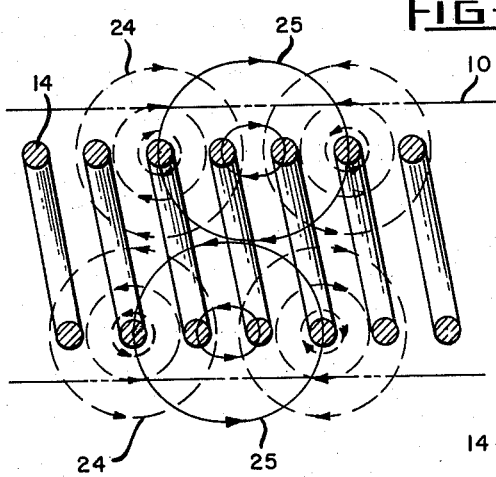
Figure 2 is a fragmentary sectional view of a helix about which the electric and magnetic field distribution of an electromagnetic wave thereon is shown schematically for a conventional traveling wave tube which does not embody our invention.
Figure 3:
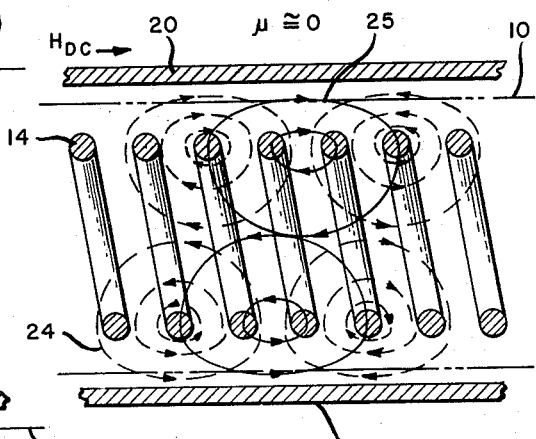
Figure 3 is a sectional view, similar to Figure 2, showing displacement of the electromagnetic field distribution by an adjacent ferrite element having low effective permeability.
Figure 4:
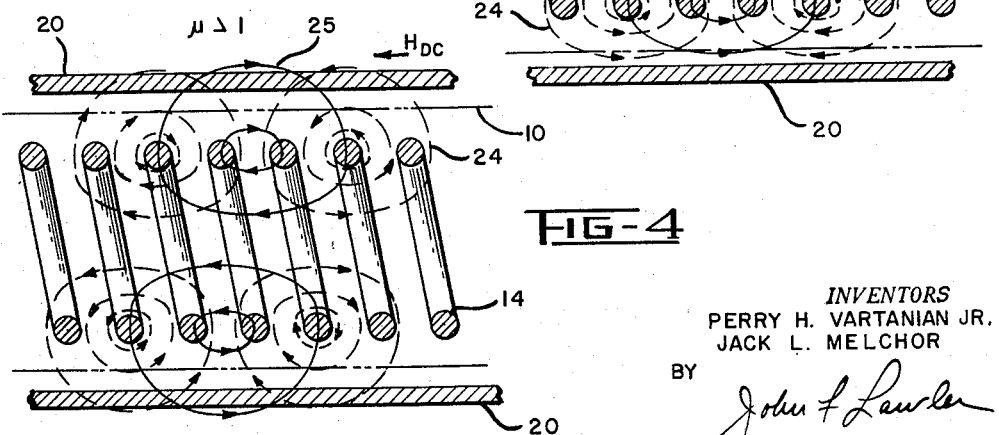
Figure 4 is similar to Figure 3 showing the effect on field distribution of ferrite having relatively high effective permeability.

These effects of the ferrite element on the operation of the traveling wave tube are, for the sake of pictorially describing the operation, graphically illustrated in Figures 2, 3 and 4 wherein the broken line concentric loops 24 represent the magnetic field of waves on the helix 14 and solid line loops 25 designate the electric field. The electric and magnetic fields in a conventional traveling wave tube generally are distributed equally on the inside and on the outside of the helix as illustrated in Figure 2. This distribution is altered as shown in Figure 3 by the close-fitting ferrite sleeve 20 having a low or zero permeability characteristic, the alteration being a greater concentration of the electric and magnetic fields within the helix than without. The result is increased interaction between the electric field and the electron beam and an increased beam-coupling coefficient. Figure 4 shows the effect of a ferrite sleeve having a relatively high effective permeability, the R.F. field distortion being the opposite of that in Figure 3, that is, the magnetic and electric fields of the waves are distorted outwardly of the helix into the ferrite and away from the electron beam. With a less intense electric field inside the helix, the interaction with the electrons is correspondingly smaller. The beam-coupling coefficient under these conditions is likewise reduced.

An important advantage of this invention is that the resultant stronger interaction between the beam and wave traveling in one direction produces significantly improved gain characteristics for the traveling wave amplifier and an increased power output for the backward wave oscillator. In addition to so improving tube performance, the ferrite sleeve also suppresses the tendency of such amplifiers to break into oscillations, and does so without substantially attenuating or impairing the desired signal.

The operation of the traveling wave tube embodying the present invention is such that the required strength of the magnetic field for magnetizing the ferrite is small. Therefore, the ferrite element ideally can be biased by the same field that focuses the electron beam, and the proper intensity of the field in the vicinity of the ferrite may, if necessary, be achieved by shielding or similar means. No separate magnetic field source is needed for the ferrite.

Another important feature of the invention is that the differential permeability characteristic of the ferrite for either direction of transmission of the wave on the helix is relatively constant over a wide range of frequencies and therefore traveling wave tubes and backward wave oscillators embodying the invention are relatively broadband devices. Stated differently, the bandwidth of traveling wave tubes and backward wave oscillators embodying this invention is not reduced by the addition of the ferrite element in accordance with this invention. Also, limited variations in field strength due to fluctuations in the current supply of the electro-magnet have little effect on the ferrite for the above reason.

Changes, modifications and improvements to the above described embodiment of the invention may occur to those skilled in the art without departing from the precepts of the invention. The scope of the invention, therefore, is defined in the appended claims.

We claim:

1. In combination with a traveling wave tube comprising a slow wave structure for transmission of electromagnetic waves, means for directing an electron beam axially of the tube through said helix, and external magnet means for focusing said beam, a ferrite element supported exteriorly of said tube within said magnet means and substantially coextensive with said helix, the portion of the field of said magnet means in the vicinity of said ferrite element having an intensity such that the ferrite element exhibits low attenuation of and substantially zero permeability to the waves traveling in one direction on said structure and low attenuation of and a relatively high permeability to waves traveling in the opposite direction whereby interaction between said waves and the electron beam is increased for said one direction of transmission and is decreased for the opposite direction of transmission.

2. A traveling wave tube comprising an elongated envelope, a slow wave structure within said envelope, terminal means coupled to at least one end of said structure transmitting electromagnetic waves between said structure and external circuits, means for directing an electron beam axially of the tube adjacent to said structure, a low loss element having non-reciprocal permeability characteristics and disposed externally of said envelope and spaced closely to said structure whereby the element is in the region of the fields of said electromagnetic waves, and means for biasing said element with a unidirectional magnetic field having an intensity sufficient to produce a minimum attenuation characteristic together with said differential permeability characteristic in the element whereby the fields of waves traveling in one direction on said structure are concentrated in the vicinity of said electron beam.

3. The tube according to claim 2 in which said last-named means comprises the electron beam focusing magnet.

4. In an energy interchange device, a slow wave structure for propagating electromagnetic waves, means for directing an electron beam adjacent to one side of said structure, a magnetized ferrite element having a non-reciprocal permeability characteristic and a reciprocal attenuation characteristic disposed adjacent to the other side of said structure, said ferrite element presenting low attenuation and a high magnetic permeability to waves traveling in one direction on said structure and low attenuation and a low magnetic permeability to waves traveling in the reverse direction, and means to so magnetize said ferrite element.

References Cited in the file of this patent
UNITED STATES PATENTS

| | | |
|---|---|---|
| 2,798,203 | Robertson | July 2, 1957 |
| 2,829,301 | Azema | Apr. 1, 1958 |
| 2,849,642 | Goodall | Aug. 26, 1958 |
| 2,851,631 | Birdsall | Sept. 9, 1958 |
| 2,867,745 | Pierce | Jan. 6, 1959 |
| 2,870,367 | Everhart et al. | Jan. 20, 1959 |
| 2,900,557 | Webber et al. | Aug. 18, 1959 |